United States Patent [19]

Oyama et al.

[11] 3,905,208
[45] Sept. 16, 1975

[54] FLEXIBLE SHAFT COUPLING

[75] Inventors: Hiroichi Oyama; Yoshinori Matsuki; Fujio Ohkawa, all of Yokohama, Japan

[73] Assignee: Bridgestone Tire Company Limited, Kyobashi, Japan

[22] Filed: Feb. 8, 1974

[21] Appl. No.: 440,904

[30] Foreign Application Priority Data
Feb. 9, 1973 Japan............................. 48-16200

[52] U.S. Cl. ............... 64/11 R; 64/2 R; 64/27 NM; 64/DIG. 2; 403/378
[51] Int. Cl.² ...................... F16D 3/17; F16D 3/14
[58] Field of Search ......... 64/27 NM, DIG. 2, 27 R, 64/2 R, 11 R; 403/378, 379

[56] References Cited
UNITED STATES PATENTS

| | | | |
|---|---|---|---|
| 2,174,010 | 9/1939 | Patterson | 64/11 R |
| 2,667,768 | 2/1954 | Winkler et al. | 64/11 R |
| 2,824,434 | 2/1958 | Stern | 64/27 NM |
| 3,283,538 | 11/1966 | Trefny | 64/27 R |
| 3,779,038 | 12/1973 | Steumky | 64/11 B |
| 3,797,619 | 3/1974 | Suzuki | 64/DIG. 2 |
| 3,821,882 | 7/1974 | Eheim | 64/11 R |

*Primary Examiner*—Samuel Scott
*Assistant Examiner*—Randall Hall
*Attorney, Agent, or Firm*—Sughrue, Rothwell, Mion, Zinn & Macpeak

[57] ABSTRACT

A flexible shaft coupling comprising a cylindrical elastomeric body having a reinforcement embedded therein, a mounting piece adapted to be fixed to a driving shaft and having a shaft fitted within one end of the elastomeric body, a cylindrical member tightly fitted on that portion of the end of the elastomeric body which accommodates the shaft of the mounting piece to deform that portion radially inwardly thereby clamping together the shaft and the elastomeric body, and coupling members consisting of a protrusion formed on the shaft of the mounting piece or on the cylindrical member and a notch formed in the cylindrical member or in an annular member fixed to the shaft of the mounting piece to form clearances between the protrusion and side walls of the notch, thereby providing a coupling characteristics in which a torque does not increase so much at the commencement of rotation of the mounting piece on the driving shaft but increases relatively rapidly to the maximum torque as the mounting piece rotates further after an elapse of the initial short period of time.

7 Claims, 5 Drawing Figures

FIG_1
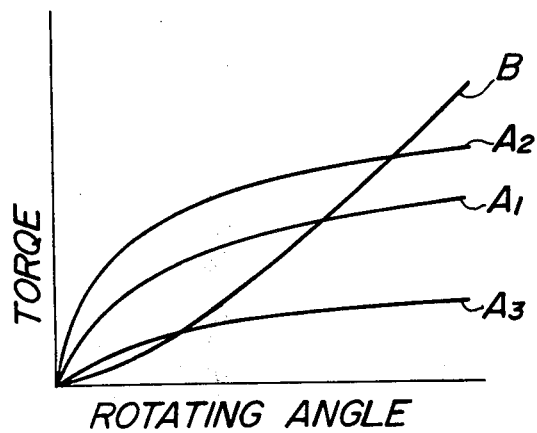
FIG_2
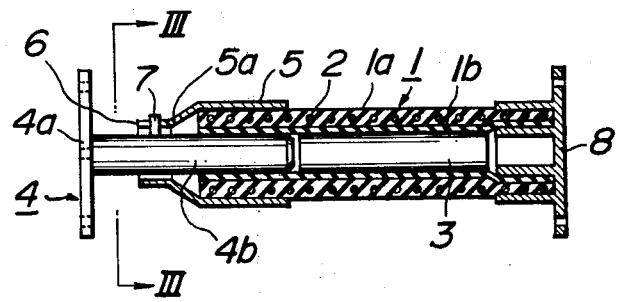

FIG_3
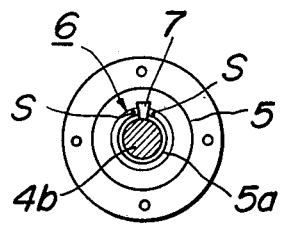
FIG_4
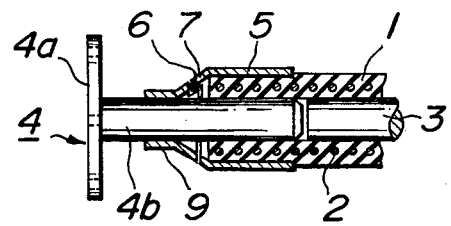
FIG_5
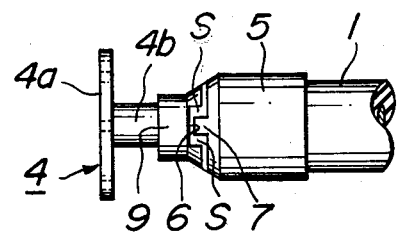

FLEXIBLE SHAFT COUPLING

BACKGROUND OF THE INVENTION

1. Field of the Invention

The present invention relates to a flexible shaft coupling which is particularly suitable for use in a handle shaft for automobiles.

2. Description of the Prior Art

It has been suggested that a flexible coupling consists of a cylindrical elastomeric body reinforced by steel wires embedded therein and provided at its ends with mounting pieces, as disclosed in Japenese Pat. application Publication No. 14,805/69. With the prior art construction, the coupling exhibits a torque-rotating angle characteristics in which as soon as the mounting piece of the elastomeric body on a driving shaft starts to rotate, a torque increases immediately to a value near the maximum torque to be transmitted. However, such a characteristics is not desirable for an application of the coupling to a handle shaft for automobiles and in order to improve the maneuverability of the handle for automobiles it has been expected to provide a flexible coupling having an ideal characteristics in which a torque does not increase so much at the commencement of rotation of the mounting piece on the driving shaft but increases relatively rapidly as the mounting piece rotates further after the elapse of the initial short period of time.

SUMMARY OF THE INVENTION

In order to realize the ideal characteristics, the flexible coupling according to the invention comprises a cylindrical elastomeric body having a reinforcement embedded therein, a mounting piece adapted to be fixed to a rotary shaft and having a cylindrical shaft fitted within one end of said elastomeric body, a cylindrical member tightly fitted on that portion of said end of the elastomeric body which receives said cylindrical shaft to deform that portion radially inwardly thereby clamping together said shaft and said elastomeric body, and coupling means between said mounting piece and said cylindrical member for providing a positive engagement therebetween after an elapse of disengaging period of time when one of said mounting piece and cylindrical member starts to rotate in one of normal and reverse directions.

A primary object of the invention is, therefore, to provide an improved flexible shaft coupling having a characteristics in that a torque does not increase so much at the beginning of the rotation but increases rapidly as a mounting piece rotates further to the maximum torque to be transmitted.

A further object of the invention is to provide an improved flexible shaft coupling which is simple in construction and easy to manufacture and has a vibration proof performance.

BRIEF DESCRIPTION OF THE DRAWINGS

These and other objects, features and advantages of the invention will become more apparent upon a reading of the following description and drawings, in which:

FIG. 1 is a graph illustrating torque-rotating angle characteristic curves of prior art flexible couplings and the coupling according to the invention;

FIG. 2 is a longitudinal sectional view of a preferred embodiment of the coupling according to the invention;

FIG. 3 is a sectional view taken along the line III—III in FIG. 2;

FIG. 4 is a longitudinal sectional view of another embodiment of the coupling according to the invention; and FIG. 5 is a plan view of the coupling shown in FIG. 4.

DESCRIPTION OF THE PREFERRED EMBODIMENTS

As illustrated in FIG. 1 showing torque-rotating angle characteristic curves of flexible coupling, conventional flexible couplings exhibit characteristic curves $A_1$, $A_2$ and $A_3$ which may vary in absolute value depending upon an arrangement of its reinforcement embedded in elastomeric bodies. These curves clearly indicate that a torque increases rapidly as soon as a driving shaft starts to rotate and then increases progressively to a maximum torque to be transmitted. As above described this characteristics is not desirable for installing the coupling in a handle shaft for automobiles. A characteristic curve B in FIG. 1 illustrates the characteristics of the flexible coupling according to the invention in which a torque does not increase so much during an initial short period of time but increases remarkably after the elapse of the initial period of time. This characteristics is ideal for using the coupling in a handle shaft for automobiles and is accomplished by the following preferred embodiments of the invention.

Referring now to FIGS. 2 and 3, there is shown a flexible shaft coupling according to the invention, which comprises a hollow or solid elastomeric body 1 made of such as rubber in which are embedded steel wires 2 as a reinforcement. In the embodiment shown, the elastomeric body 1 consists of an outer layer 1a and an inner layer 1b of a relatively soft material to form a hollow cylindrical shape and is provided with an elastomeric member 3 which is inserted as a reinforcement into the hollow cylinder at the midway of the body 1 for preventing it from being bent when it is subjected to a large torsional force.

To one end of the elastomeric body 1 is fixed a mounting piece 4 which is to be fixed to a rotary driving shaft (not shown). The piece 4 consists of a mounting flange 4a and a cylindrical shaft 4b which is inserted into the end of the body 1. A cylindrical member 5 is tightly fitted on that portion of the body 1 which accommodates the shaft 4b to deform the portion radially inwardly thereby clamping together the shaft 4b and the body 1. A cylindrical end 5a of the member 5 extends to encircle the shaft 4b and is formed with a notch 6 having a width in the circumferential direction, the meaning of which will be later explained. The shaft 4b of the mounting piece 4 is provided with a protrusion 7 which in assembled position is within the notch 6 of the member 5 to form desired amounts of clearances S between the protrusion 7 and the side walls of the notch 6. To the other end of the elastomeric body 1 is tightly fitted a flanged mounting piece 8 by radially deforming the former, which is to be fixed to a separate rotary driving or driven shaft (not shown).

The coupling shown in FIGS. 2 and 3 operates as follows. When the mounting piece 4 is driven by the rotary driving shaft (not shown), the shaft 4b formed integrally with the mounting piece 4 rotates slightly equivalent to the clearance S between the protrusion 7 and one of the walls of the notch 6 while the inner wall of the body 1 is deformed due to a torsional or shearing stress caused by the rotational movement of the shaft 4b. For the moment the elastomeric body 1 is being subjected to a driving force with a slight reaction which may be particularly small owing to the inner layer 1b of the body 1 made of the relatively soft material as in the embodiment. The shaft 4b rotates further until the protrusion 7 abuts against one of the walls of the notch 6, so that the whole elastomeric body 1, probably mainly its reinforced outer layer 2, is subjected to the driving force which is transmitted through the mounting piece 8 to the driven shaft (not shown). In this manner, the torque-rotating angle characteristic curve B is obtained as shown in FIG. 1. It should be understood that the characteristic curve can be obtained even if the mounting of the driving and driven shafts is reversed in the above embodiment.

It should be noted that in the embodiment of the invention as shown in FIGS. 2 and 3 the protrusion 7 of the mounting piece 4 and the notch 6 of the cylindrical member 5 form specific coupling means in which when the piece 4 or the member 5 first starts to rotate in normal or reverse direction, they are positively engaged with each other after the elapse of the disengaging period of time. Although in the illustrated embodiment the coupling means is provided only on the end of the elastomeric body 1, it is to be understood that the coupling means can be provided on both ends of the body 1 for the purpose of increasing the angle for transmitting the torque through the shearing deformation of the inner layer of the body 1. Referring to FIGS. 4 and 5 wherein another embodiment of the coupling is shown, the same reference numerals have been utilized to identify like parts in FIGS. 2 and 3. In order to accomplish the same purpose as in the previous embodiment, a cylindrical member 5 is formed at its end with a protrusion 7 and an annular member 9 is fixed to a shaft 4b as by welding and is formed with a notch 6 corresponding to the protrusion 7 to form clearances between the protrusion and the walls of the notch 6. In the embodiment, the elastomeric body 1 consists of a single layer so that the inner wall portion of the layer is deformed due to the torsional stress caused by the rotational movement of the shaft 4 for the disengaging period of time.

It can be seen from the above description the flexible coupling according to the invention exhibits the characteristic curve B as shown in FIG. 1 wherein the transmitting torque is slight while the rotating angle is small and the torque increases rapidly as the rotating angle increases, so that during the relatively small rotating angle the torque can be effectively transmitted substantially without any back-lash between the rotating parts.

The flexible coupling according to the invention is so simple in construction that in conjunction with the characteristics a good connection between two shafts can be accomplished with a vibration proof performance.

It is further understood by these skilled in the art that the foregoing description is preferred embodiments of the invention and that various changes and modifications may be made in the invention without departing from the spirit and scope thereof.

What is claimed is:

1. A flexible shaft coupling comprising: a) a cylindrical elastomeric body having an outer layer with a reinforcement embedded therein and an inner layer of softer elastomeric material than said outer layer; b) a mounting piece adapted to be fixed to a driving shaft, said mounting piece having a cylindrical shaft extending from one side and fitted within a first end of said elastomeric body; c) a cylindrical member tightly fitted about said first end of the elastomeric body so as to deform said first end radially inwardly, thereby clamping together said cylindrical shaft and said elastomeric body; and d) coupling means between said mounting piece and said cylindrical member such that only said inner layer transmits torque to a driven shaft upon initial rotation of said mounting piece, and after a predetermined angle of rotation of said mounting piece both said inner and said outer layers transmit torque to a driven shaft.

2. A flexible shaft coupling as set forth in claim 1, wherein said coupling means consists of a protrusion (7) and a notch (6).

3. A flexible shaft coupling as set forth in claim 1, wherein said coupling means consists of a protrusion (7) formed on said cylindrical shaft (4b) of said mounting piece (4) and a notch (6) formed in a part (5a) of said cylindrical member (5) to form clearances (S) between said protrusion (7) and side walls of said notch (6).

4. A flexible shaft coupling as set forth in claim 1, wherein said coupling means consists of a protrusion (7) formed on said cylindrical member (5) and a notch (6) formed in an annular member (9) fixed to said cylindrical shaft (4b) of said mounting piece (4) to form clearances (S) between said protrusion (7) and side walls of said notch (6).

5. A flexible shaft coupling as set forth in claim 1, wherein said coupling means is arranged on the side of a driving shaft.

6. A flexible shaft coupling as set forth in claim 1, wherein said coupling means is arranged on the side of a driven shaft.

7. A flexible shaft coupling as set forth in claim 1, wherein said coupling means are arranged on both sides of driving and driven shafts.

* * * * *